United States Patent [19]

Bondoc

[11] 4,269,886
[45] May 26, 1981

[54] NOVEL GLASS FIBER MAT

[75] Inventor: Alfredo A. Bondoc, Middlesex, N.J.

[73] Assignee: GAF Corporation, New York, N.Y.

[21] Appl. No.: 70,991

[22] Filed: Aug. 30, 1979

Related U.S. Application Data

[63] Continuation-in-part of Ser. No. 923,553, Jul. 11, 1978, Pat. No. 4,183,782.

[51] Int. Cl.$^3$ .............................................. B32B 7/00
[52] U.S. Cl. ................................ 428/219; 428/141; 428/220; 428/278; 428/288; 428/291; 428/297; 428/303; 428/332; 428/337; 428/338; 428/392
[58] Field of Search ............... 428/219, 220, 222, 224, 428/273, 280, 288, 291, 297, 303, 332, 337, 338, 392, 278; 162/156, 145

[56] References Cited

U.S. PATENT DOCUMENTS

| | | | |
|---|---|---|---|
| 2,702,241 | 2/1955 | Hawley et al. | 162/145 |
| 2,797,163 | 6/1957 | Smith et al. | 162/156 |
| 2,859,109 | 11/1958 | Hawley et al. | 162/156 |
| 2,906,660 | 9/1959 | Hungerford et al. | 162/156 |
| 3,004,878 | 10/1961 | Tomlinson | 162/145 |
| 3,015,582 | 1/1962 | Simison | 162/145 |
| 3,142,612 | 7/1964 | Reiman | 162/145 |
| 3,228,825 | 1/1966 | Waggoner | 162/156 |
| 4,052,257 | 10/1977 | Hill et al. | 162/156 |
| 4,118,272 | 10/1978 | Ziegler et al. | 162/156 |
| 4,179,331 | 12/1979 | Chokrabarti | 162/156 |
| 4,183,782 | 1/1980 | Bondor | 162/156 |

Primary Examiner—James J. Bell
Attorney, Agent, or Firm—James Magee, Jr.; Walter Katz

[57] ABSTRACT

A novel glass fiber mat is described herein. The mat includes a plurality of substantially uniformly enmeshed individual filament fibers which comprise at least 70% by weight of the fibrous component of the mat. The mat is further characterized in that less than 20% of the area of the mat are voids which extend through the thickness of the mat, the rest being fibrous material, of said voids, at least 80%, 30% and 10%, have an equivalent diameter whose size is less than about 50 microns, 10 microns and 5 microns, respectively. This mat has an exceedingly high tensile strength both in the machine and the cross-machine directions.

11 Claims, 1 Drawing Figure

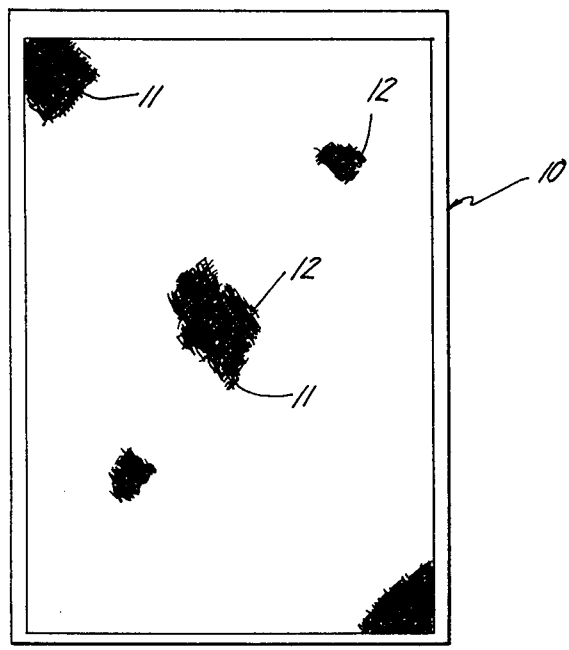

NOVEL GLASS FIBER MAT

This Appl N. is a C-I-POF 923,553, 7-11-78, now U.S. Pat. No. 4,183,782.

BACKGROUND OF THE INVENTION

1. Field of the Invention

This invention relates to novel glass fiber mats, and more particularly, to mats which are useful in application in roofing and flooring products.

2. Description of the Prior Art

Thin sheets or mats of glass fibers are finding increasing application in the building materials industry, as for example, as felts in roofing products and as backing sheets for vinyl flooring. These glass fiber mats are replacing similar sheets made traditionally of cellulosic or asbestos fibers. Glass fiber mats usually are made commercially by a wet-laid process, which is carried out on modified paper making machinery, as described, for example, in the book by O. A. Battista, Synthetic Fibers in Papermaking (Willey 1964: N.Y.) A number of U.S. Pat. Nos. also provide a rather complete description of the wet-laid process and glass mats produced thereby, including 2,477,55, 2,731,066, 2,906,660, 3,012,929, 3,021,255, 3,050,427, 3,103,461, 3,108,891, 3,228,825, 3,634,054, 3,749,638, 3,760,458, 3,766,003, 3,838,995, 3,853,683, 3,905,067, 4,052,257, 4,112,174, 4,129,674 and 4,135,029.

Unfortunately, however, none of these prior art glass fiber mats possess, in combination, the high percentage of uniformly enmeshed individual filament fibers, small diameter voids, and high strength properties which are desirable in application in roofing products, or the smooth surface and flexibility which is sought after as felts in flooring materials.

RELATED PATENT APPLICATIONS

Copending U.S. patent application, Ser. No. 923,553, filed July 11, 1978 (FDN-1097) now U.S. Pat. No. 4,183,782, by the same inventor and assigned to the same assignee as this application, describes and claims a wet-laid process for preparing glass fiber mats. The present application is a continuation-in-part of said copending application.

FDN-1097/B, filed concurrently herewith, describes and claims high-strength roofing products using novel glass fiber mats.

OBJECTS AND SUMMARY OF THE INVENTION

Accordingly, it is an object of the present invention to provide a novel glass fiber mat having the desired sructural and physical properties which are uniquely suitable for use in roofing and flooring products.

A specific object of this invention is to provide a novel glass fiber mat which has at least 70% by weight of the fibers therein in the form of uniformly enmeshed individual filament fibers.

Another object of the invention is to provide such a novel glass fiber mat in which less than about 20% of the area of the mat and voids which extend through the thickness of the mat, the rest being fibrous material. A further object of the invention is to provide a glass fiber mat wherein at least about 80%, 30% and 10% of the voids have an equivalent diameter whose size is correspondingly less than about 50 microns, 10 microns and 5 microns, respectively.

Still another object herein is to provide such a novel glass fiber mat with fibers having a length of about ¼ inch to 3 inches and a diameter of about 3 to 20 microns, the mat including about 70% to 90% glass fibers and about 10% to 30% binder to hold the fibers together, and wherein the mat has a thickness of about 0.1 mm. to 3 mm. and a basis weight of about 20 g./m$^2$ to 200 g./m$^2$.

Yet another object herein is to provide a novel glass fiber mat of said structure which exhibits excellent tensile strength in both the machine and cross machine directions for application in roofing products.

Among the other objects of the invention is to provide such a unique glass fiber mat whose porosity is suitable for impregnation of asphalt therein in the manufacture of both asphalt roofing shingles and built up roofing membranes and systems.

Included in the objects herein is to provide a novel glass fiber mat having an exceedingly smooth surface which mat may be used to advantage as a flooring felt in vinyl flooring products.

THE DRAWING

The FIGURE is an actual photographic reproduction of the novel glass fiber mat of the present invention.

DETAILED DESCRIPTION OF THE INVENTION

In accordance with the objects and summary of the invention, there is provided herein a novel glass fiber mat having the desired structural features and physical properties eminently used for commercial application in roofing and flooring products. Referring now to the Figure, there is shown the novel glass mat of the invention. The mat, generally referred to by reference numeral 10, includes a plurality of substantially uniformly enmeshed individual filament fibers 11 which comprise at least 70%, preferably 80% and optimally about 90% or greater, by weight of the fibrous component of the mat. Less than about 20% of the area of the mat are voids 12, which extend through the thickness of the mat, the rest being fibrous material. At least 80%, 30% and 10% of the voids have an equivalent diameter whose size is less than about 50 microns, 10 microns and 5 microns, respectively.

The fibers suitably have a length of about ¼ to 3 inches and a diameter of about 3 to 20 microns. The mat has a thickness of about 0.1 to 3 mm., preferably 0.3 to 2 mm., and a basis weight, including a binder material to hold the fibers together of about 20 to 200 g./m$^2$, preferably 40 to 110 g./m$^2$. The fibrous material usually comprises about 70% to 90% by weight of the mat, and the binder about 10% to 30%. Any suitable binder substance may be used, which is usually a resinous material.

The following description of the formation of the mat of the invention will be made by reference to the wet-laid process described in the copending application, although it will be understood that changes and modifications in the process conditions may be made within the skill of the art, as is known in a wet-laid process.

Accordingly, the wet-laid process comprises first forming an aqueous suspension or dispersion of a plurality of chopped bundles of glass fibers, each of which contains from about 20 to 300 fibers per bundle, by intense agitation of the bundles in a dispersant medium in a mixing tank. The process is intended to filamentize or separate the fibers in the bundle within the aqueous dispersant medium. The dispersant composition then is fed through a moving screen on which the filaments enmesh themselves while water is being removed.

Preferably the dispersant medium includes a derivatized guar gum (hereinafter defined), alone, or optimally, in combination with a second dispersant component, suitably such as a tertiary amine oxide (also defined later). The glass fiber dispersion is made by first thoroughly mixing the derivatized guar gum in tap water to form a viscous mixture. Then the tertiary amine oxide constituent is added with stirring, and the chopped bundles of glass fibers are admixed to form the desired fiber disperion composition.

After preparation of the stock glass fiber dispersion composition in this manner, the dispersion is pumped to a head box of a mat-forming machine where the desired glass mat is formed as a wet mat on the belt of the machine. A suitable binder then is applied to the formed mat, which is then dried, set and/or cured.

In a preferred embodiment of the invention, the derivatizd guar gum component of the dispersion composition includes substituent groups attached to guar gum itself. Derivatized guars suitable for use herein are identified as such in the commercial products which are available from Stein, Hall and Co., Inc. Typical derivatized guars include JAGUAR CMHP, which is a carboxymethylhydroxypropylated guar gum; C-13, which is a quaternary ammonium guar gum; and JAGUAR HP-11, which is a hydroxypropylated guar gum.

The amine oxide surfactant component of the dispersion composition is a tertiary amine oxide having the formula:

which is bis(2-hydroxyethyl) tallow amine oxide, available from Armak Co.; and Ammonyx SO, which is dimethylstearylamine oxide, available from Onyx Chemical Co.

A particularly useful amine oxide is Aromox DMHT, which has the formula:

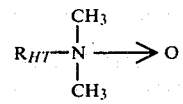

where $R_{HT}$ is $R_T$ hydrogenated to saturation, and $R_T$ is 3% tetradecyl, 27% hexadecyl, 16% octadecyl, 48% octadecenyl and 6% octadecadienyl.

In order to further define a preferred mode of priming the mat of the invention the suitable, preferred and best mode parameters of such a process are given below in Table II. The followig definitions apply to this data:

"Dispersion consistency" is the precent by weight of the glass fibers in the stock aqueous dispersion medium. "Formation consistency" is defined as the consistency of the fibers at the head box of the mat-forming machine, which may be the same or lower consistency than the dispersion consistency. The dispersion compsition may be diluted with water before entering the head box; this "diluted formation consistency" is given in Table I. The "amine oxide concentration" is given in ppm of this component. The "derivatized guar gum concentration" is indicated as percent by weight of the composition.

|  | Fiber Dispersion Consistency % | Diluted Fiber Formation Consistency % | Conc. of Amine Oxide (ppm) | Conc. of Derivatized Guar Grum (% by wt.) | Glass Fiber Length (in.) | Glass Fiber Diameter (microns) |
|---|---|---|---|---|---|---|
| Suitable Range | 0.1–2% | 0.01–1% | 5–500 | 0.05–0.5 | ⅛–3 | 3–20 |
| Preferred Range | 0.2–1% | 0.2–0.5% | 10–200 | 0.1–0.3 | ¼–2 | 5–18 |
| Best Mode Value | 0.5 | 0.03 | 20 | 0.2 | 1 | 16 |

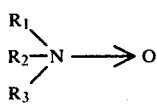

where $r_2$, $R_2$ and $R_3$ suitably are hydrocarbon groups containing between 1–30 carbon atoms. The hydrocarbon groups can be aliphatic or aromatic, and, if aliphatic, can be linear, branched or cyclic, and can be the same or different in each radical. The aliphatic hydrocarbon radical also can contain ethylenic unsaturation. Preferably, aliphatic groups are selected from among alkyl groups, such as lower alkyl or hydroxyalkyl groups having from 1–4 carbon atoms, and other substituted alkyl groups thereof, or long chain alkyl groups, having from 12–30 carbon atoms, such as stearyl, laurel, oleyl, tridecyl, tetradecyl, hexadecyl, dodecyl, octadecyl, nonadecyl, or substituted groups thereof, derived from natural or synthetic sources. The sum of the $R_1$, $R_2$ and $R_3$ groups is about 14–40 carbon atoms, and, most preferably, about 18–24 carbon atoms.

Typical commercial amine oxides prepared for use herein include Aromox DMHT, which is dimethyl hydrogenated tallow amine oxide; Aromox DM16, which is dimethylhexadecylamine oxide; Aromox T/12, Commercial glass fibers which form dispersions in the composition of the invention may be used herein, including, for example, glass fiber types E or C. Such fibers may be sized or unsized, and usable as dry or wet chopped form.

The glass mats produced in the process are uniform mats which have high tensile and tear strengths. For increased tensile strengths, generally, fibers of relatively lower diameters are used, while higher tear strengths are enhanced by using longer length and smaller diameter fibers.

The example which follow will illustrate the invention, but is not to be considered as being limiting of the principles or practice thereof.

EXAMPLE 1

The mat-forming machine was a 0.5 m inclined wire Hydroformer which was adjusted to a processing condition to give a preferred fiber orientation in the machine direction (MD) over the cross machine direction (CMD). The dispersion composition consisted of Aromox DMHT, 20 ppm, CMHP, 0.2%, E-type glass fibers, 25 mm length, 16 micron diameter, sized, and wet chopped. The dispersion consistency was 0.5%, the diluted formation consistency was lowered to 0.03 after dilution with additional dispersion composition removed during mat formation at the headbox. The formed glass mat is then impregnated with urea-formaldehyde resin, dried and cured. The glass mat, with about 25% by weight binder, had an excellent tensile strength, N/50 mm width, MD/CMD of 500/282, at a basis weight of 110 g/m². The mat thickness was about 1 mm.

What is claimed is:

1. A novel glass fiber mat comprising glass fibers, voids extending through the thickness of said mat and a binder to hold said fibers together, said fibers having a length of about ¼ to 3 inches and a diameter of about 3 to 20 microns, said mat having a thickness of about 0.1 to 3 mm. and a basis weight of about 20 to 200 g./m², characterized in that:
   (a) at least about 70% by weight of said fibers are substantially uniformly enmeshed individual filament fibers,
   (b) less than about 20% of the area of said mat are voids which extend through the thickness of the mat, the rest being fibers, and,
   (c) at least about 80%, 30% and 10% of said voids have an equivalent diameter which is less than about 50, 10 and 5 microns, respectively.

2. A novel glass mat according to claim 1 wherein said individual filament fibers comprise at least 80% by weight of said fibers.

3. A novel glass mat according to claim 1 wherein said individual filament fibers comprise at least 90% by weight of said fibers.

4. A novel glass fiber mat according to claim 1 wherein the length of said fibers are about ½ to 1-½ inches.

5. A novel glass fiber mat according to claim 1 wherein the diameter of said fibers are about 8 to 19 microns.

6. A novel glass fiber mat according to claim 1 wherein said thickness of said mat is about 0.3 to 2 mm.

7. A novel glass fiber mat according to claim 1 wherein said basis weight of said mat is about 40 to 110 g./m².

8. A novel glass fiber mat according to claim 1 wherein said fibers comprise about 70% to 90% and said binder about 10% to 40% by weight of said mat.

9. A novel glass fiber mat according to claim 1 wherein the tensile strength is at least 300/100 N/50 mm width MD/CMD, respectively, at a basis weight of about 100 g./m².

10. A novel glass fiber mat according to claim 1 wherein at least 15% of said voids have an equivalent diameter which is less than 5 microns.

11. A novel glass fiber mat according to claim 1 having a fiber length of about 1 inch, a fiber diameter of about 16 microns, a mat thickness of about 1 mm., a basis weight of about 110 g./m², fiber and binder contents of about 80% and 20%, respectively, a tensile strength of about 500/280 N/50 mm width, MD/CMD, respectively, further characterized in that about 85% by weight of said fibers are substantially uniformly enmeshed individual filament fibers, about 18.4% by area of said mat are said voids, the rest being fibers, about 82.9%, 37.0% and 17.9% of said voids having an equivalent diameter which is less than 50, 10 and 5 microns, respectively.

* * * * *